(12) United States Patent
Gan

(10) Patent No.: US 9,952,307 B2
(45) Date of Patent: Apr. 24, 2018

(54) ADAPTIVE ANTENNA TRACKING OF MOVING TRANSMITTERS AND RECEIVERS

(71) Applicant: Facebook, Inc., Menlo Park, CA (US)

(72) Inventor: Hong Gan, San Diego, CA (US)

(73) Assignee: Facebook, Inc., Menlo Park, CA (US)

( * ) Notice: Subject to any disclaimer, the term of this patent is extended or adjusted under 35 U.S.C. 154(b) by 252 days.

(21) Appl. No.: 14/840,430

(22) Filed: Aug. 31, 2015

(65) Prior Publication Data
US 2017/0059688 A1 Mar. 2, 2017

(51) Int. Cl.
| | |
|---|---|
| H01Q 3/00 | (2006.01) |
| G01S 5/02 | (2010.01) |
| G01S 3/32 | (2006.01) |
| H01Q 3/28 | (2006.01) |
| H01Q 3/34 | (2006.01) |
| H01Q 3/04 | (2006.01) |
| H01Q 3/24 | (2006.01) |
| H01Q 3/26 | (2006.01) |
| H01Q 21/20 | (2006.01) |

(52) U.S. Cl.
CPC ............ *G01S 5/0284* (2013.01); *G01S 3/325* (2013.01); *H01Q 3/04* (2013.01); *H01Q 3/24* (2013.01); *H01Q 3/26* (2013.01); *H01Q 3/28* (2013.01); *H01Q 3/34* (2013.01); *H01Q 21/205* (2013.01)

(58) Field of Classification Search
CPC .. H01Q 3/00; H01Q 3/24; H01Q 3/26; H01Q 3/28; H01Q 3/34; H01Q 21/205; G01S 5/0284; G01S 3/325

USPC ........................................................ 342/372
See application file for complete search history.

(56) References Cited

U.S. PATENT DOCUMENTS

| | | | | |
|---|---|---|---|---|
| 3,774,207 | A * | 11/1973 | Yaplee ..................... | G01S 13/60 342/352 |
| 2003/0081503 | A1* | 5/2003 | Barnard ................. | G01S 3/8086 367/103 |
| 2005/0215893 | A1* | 9/2005 | Barnes ................. | G01S 15/8925 600/437 |
| 2007/0057858 | A1* | 3/2007 | Lockie ..................... | H01Q 3/04 343/763 |
| 2009/0079299 | A1* | 3/2009 | Bradley .............. | G01S 15/8925 310/322 |

(Continued)

*Primary Examiner* — Harry K Liu
(74) *Attorney, Agent, or Firm* — FisherBroyles, LLP

(57) ABSTRACT

A combined electro-mechanical adaptive antenna tracking system for wireless communication between transmitters and receivers moving relative to each other is described. This system enables one or more antenna transceivers on a moving object, such as a high altitude unmanned aerial vehicle (HALE UAV), to simultaneously track one or more separate antenna transceivers on the ground, such as multiple customer premises equipment. The antennas on the moving object are constructed with multiple-subsection phased arrays or may have multiple horns on one rotation axis. Adaptive tracking control logic is applied to synchronize electrical switch and/or mechanical rotation and electrical beamforming for the moving transceivers to track multiple ground transceivers. In one advantageous aspect, an off-the-shelf horn antenna can be used and rotated around only one axis, thereby eliminating the need for expensive two dimensional movement actuators such as gimbals and the need for tracking multiple ground based receivers.

23 Claims, 8 Drawing Sheets

(56) References Cited

U.S. PATENT DOCUMENTS

| | | | | |
|---|---|---|---|---|
| 2010/0141527 A1* | 6/2010 | Lalezari | ............ | H01Q 21/24 |
| | | | | 342/368 |
| 2011/0285582 A1* | 11/2011 | Zhang | ............ | G01S 7/024 |
| | | | | 342/26 R |
| 2012/0249366 A1* | 10/2012 | Pozgay | ............ | H04B 7/18571 |
| | | | | 342/354 |
| 2013/0162493 A1* | 6/2013 | Ridel | ............ | H01Q 3/005 |
| | | | | 343/834 |
| 2016/0056537 A1* | 2/2016 | Guler | ............ | H01Q 3/01 |
| | | | | 343/762 |

* cited by examiner

ADAPTIVE ANTENNA TRACKING OF MOVING TRANSMITTERS AND RECEIVERS

TECHNICAL FIELD

This patent application relates generally to wireless communication between an aerial vehicle and a ground station and specifically to antenna tracking and beamforming in a wireless communication apparatus.

BACKGROUND

Increased availability of the Internet and the proliferation of devices that communicate using the Internet Protocol (IP) have increased user expectations about IP communication being available at all times and all places. The telecommunication industry has begun experimenting with different ways to provide Internet connectivity in remote areas where traditional wireline Internet infrastructure is unavailable or damaged or where there is a temporary increase in demand for bandwidth for wireless communication. One such way is to use airborne relays or access points such as unmanned aerial vehicles (UAVs) that communicate with ground-based transceivers to provide Internet connectivity. While in flight, a UAV is typically not stationary with respect to the ground-based transceiver and moves, e.g., in a repetitive circular path with respect to the ground-based transceiver.

DETAILED DESCRIPTION

Figure 1:
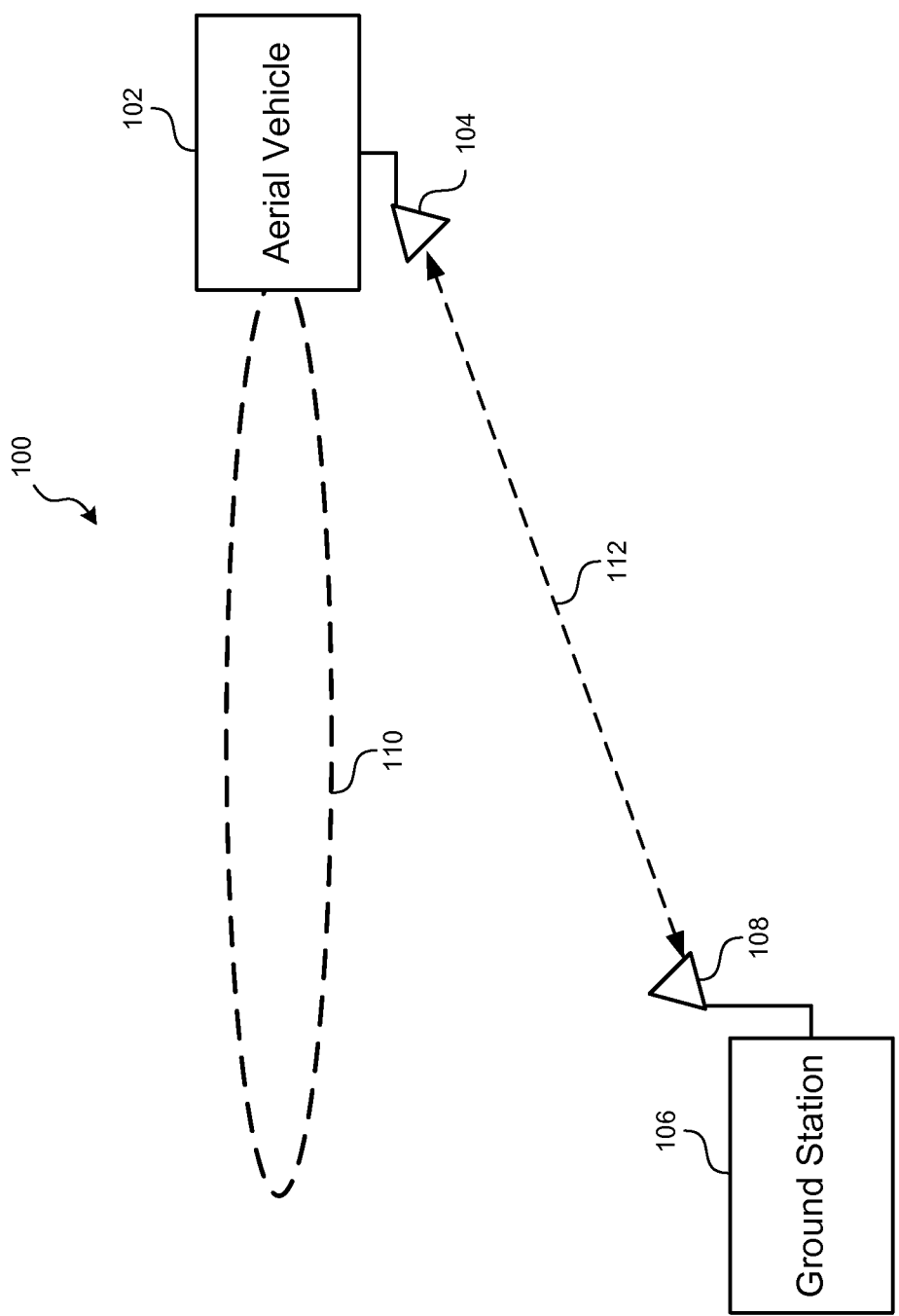
FIG. 1 is a block diagram illustrating an example communication network between a ground-based transceiver and an aerial transceiver.

In some embodiments, an antenna system tracks relative movement between a transmitter and a receiver and adaptively adjusts a radio frequency (RF) antenna beam to a receiver to allow smooth reception from an aerial transmitter, e.g., a UAV. In some embodiments, high directional antennas may be used to provide high throughput, low power and low mass antenna systems and provide multiple concurrent connections, or communication links, with multiple ground stations. Thus, in some embodiments, multiple communication links between a UAV and multiple ground stations may be concurrently tracked using a same antenna system that uses multiple antenna beams to concurrently track the multiple communication links. In various embodiments, the antenna system may use a combination of electrical beamforming, electrical switch, and mechanical movement of antennas of the antenna system to perform the tracking. The entire tracking range, which may correspond to a 360 degree latitude circle or elevation angle of the UAV trajectory and flight attitudes, may be divided into multiple sectors or portions. While a UAV is dynamically moving, the geographic area of ground stations may be logically partitioned into multiple subsections or sectors. Using the logical partitioning, tracking within a sector may be performed via electrical beamforming, and tracking across sectors may be assisted with antenna switch or rotation. In one advantageous aspect, the antenna and UAV assembly can be designed with less constraint of movement or rotation than traditional antennas with two-dimensional movements. As a result, complicated, dense gimbals, commonly associated with mechanical movement, can be eliminated. In embodiments with no multi-subsection phased array antenna conditions, rotation around only one axis, e.g., one degree of freedom, may be used to support discrete antenna unit conditions, such as one- or multiple-horn antennas. In some embodiments, an antenna system may include multiple antenna subsections, at least some of which may receive or transmit on separate communication links. An antenna switch matrix may be used for a weighted combination of the signals passing through each antenna subsection, thereby allowing concurrent tracking of communication links among multiple transmitters and/or receivers.

In some embodiments, the disclosed technology can be used to provide a reliable and low-cost communication link between an aerial vehicle and a ground-based transceiver, such as a gateway, or a user device, such as a customer-premises equipment (CPE), while the aerial vehicle is maneuvering through the air. Aerial vehicles that are able to transmit and receive data, e.g., Internet Protocol (IP) communication, may be used to extend Internet connectivity to remote areas that lack wireline infrastructure and/or when there is a temporary increased demand in communication bandwidth at a location such as a special event venue or a site of a natural disaster.

Various embodiments will now be described in further detail. The following description provides specific details for a thorough understanding and enabling description of these embodiments. One skilled in the relevant art will understand, however, that the techniques discussed herein may be practiced without many of these details. Likewise, one skilled in the relevant art will also understand that the techniques can include many other obvious features not described in detail herein. Additionally, some well-known structures or functions may not be shown or described in detail below, so as to avoid unnecessarily obscuring the relevant description.

The terminology used below is to be interpreted in its broadest reasonable manner, even though it is being used in conjunction with a detailed description of certain specific examples of the embodiments. Indeed, certain terms may even be emphasized below; however, any terminology intended to be interpreted in any restricted manner will be overtly and specifically defined as such in this section.

Turning now to the Figures, FIG. 1 is a block diagram illustrating an example communication network 100 in which an aerial vehicle 102, e.g., an airplane, an unmanned aerial vehicle (UAV), a satellite, a balloon, etc., is in communication with a ground-based station 106.

Traditionally, a transceiver of the aerial vehicle 102 is fitted with one or more antennas 104 that form one or more beams that provide coverage of an area on the ground plane. When a receiver is within this area, or "shadow" of coverage, the ground-based receiver is able to receive signals from and transmit signals to the aerial vehicle. However, if the aerial vehicle is moving, e.g., changing its position in the X, Y plane, or changing its altitude or attitude, the quality of signal transmission on a communication link 112 may suffer.

In some embodiments, the aerial vehicle 102 may be deployed to provide Internet connectivity at a location where there is a temporary communication demand, e.g., at a natural disaster location. In some embodiments, the aerial vehicle 102 may be deployed to provide Internet connectivity to a remote location where wireline infrastructure may be unavailable or where Internet connectivity is very expensive.

In some embodiments, the ground station 106 may act as an access point, or base station or gateway, e.g., to provide communication connectivity to user devices or CPEs (via the aerial vehicle). The illustrated transmitter-receiver link could be used in multiple different deployment scenarios in which the ground station may be a user device, a relay that relays communication between multiple user devices and the aerial vehicle, or a relay that relays communication to another communication device, such as another ground station. The aerial vehicle may also be a relay device that may communicate Internet traffic between user devices, typically located on the ground, and another hop in the communication network, e.g., a satellite or a cellular base station with which the aerial vehicle 102 is able to communicate using the same or a different transmitter-receiver link (not shown in FIG. 1).

One challenge in the network 100 is to maintain the communication link 112 active all the time so that the ground station 106 is able to perform real time communication with the aerial vehicle 102, even when the aerial vehicle is changing its position, e.g., as indicated by its aerial flight path 110. For a communication link, the antennas 108 and 104 may be operating with their respective apertures and certain signal gains.

In some embodiments, antennas 104 and 108 may be mechanically moved to track the flight path of the aerial vehicle 102. In some embodiments, mechanical systems that use one or more gimbals may be used to rotate antennas located at a receiver, e.g., a CPE or a UAV, to enable tracking of the transmitter, e.g., a UAV or a CPE. Although a gimbal can provide control for the dynamic changing direction, it increases cost and adds weight, limiting the applications for a low-cost communication network 100.

Furthermore, the reliability and longevity of this arrangement may depend on the reliability of the mechanical parts used for antenna movement. One possible drawback with such embodiments is that the presence of mechanical parts that move the antenna may increase the cost and complexity of the transceiver and may increase the weight and power consumption of the transceiver which may make this an undesirably large system for users.

Electrical beamforming is another technique that can be used to change the angle and path gain of an antenna system by using an antenna array and adjusting the gain or phase of each element such that the beam, or the maximum gain direction, of the antenna array points in a desired direction. The angle through which such a beam can be moved to track the transmitter, e.g., the aerial vehicle 102, may be limited to the number of antenna elements in the array. For example, in some embodiments, beamforming may be able to move the beam direction by about 7 to 10 degrees, or up to 30 degrees.

In some embodiments, a directional high-gain tracking antenna may be used, e.g., similar to a directional high-gain tracking antenna used in wideband, high-throughput communications. A directional high-gain tracking antenna may especially be useful in the microwave and millimeter wave range for high throughput, high altitude, long endurance (HALE) UAV and satellite communication systems.

A HALE UAV moves continuously at a specified speed and track, such as cruising in circles, e.g., flight path 110, to maintain its altitude and provide coverage for desired geographic locations. Consequently the antenna directions between a UAV and a fixed ground gateway, or between a UAV and CPEs, require dynamic changes to retain high gain and reliable RF links, especially for cases where the elevation angle is low.

In some embodiments, an antenna system may be designed to include multiple antennas or antenna elements that are electrically coupled with each other to operate together to provide an effective antenna gain pattern or beam for the receiver operation. In various embodiments, individual elements of the antenna array may be selected based on a desired gain, permitted mass when affixed to the transceiver, geometry of the system (such as horn, patch, or reflector, etc.), and so on.

Figure 2:
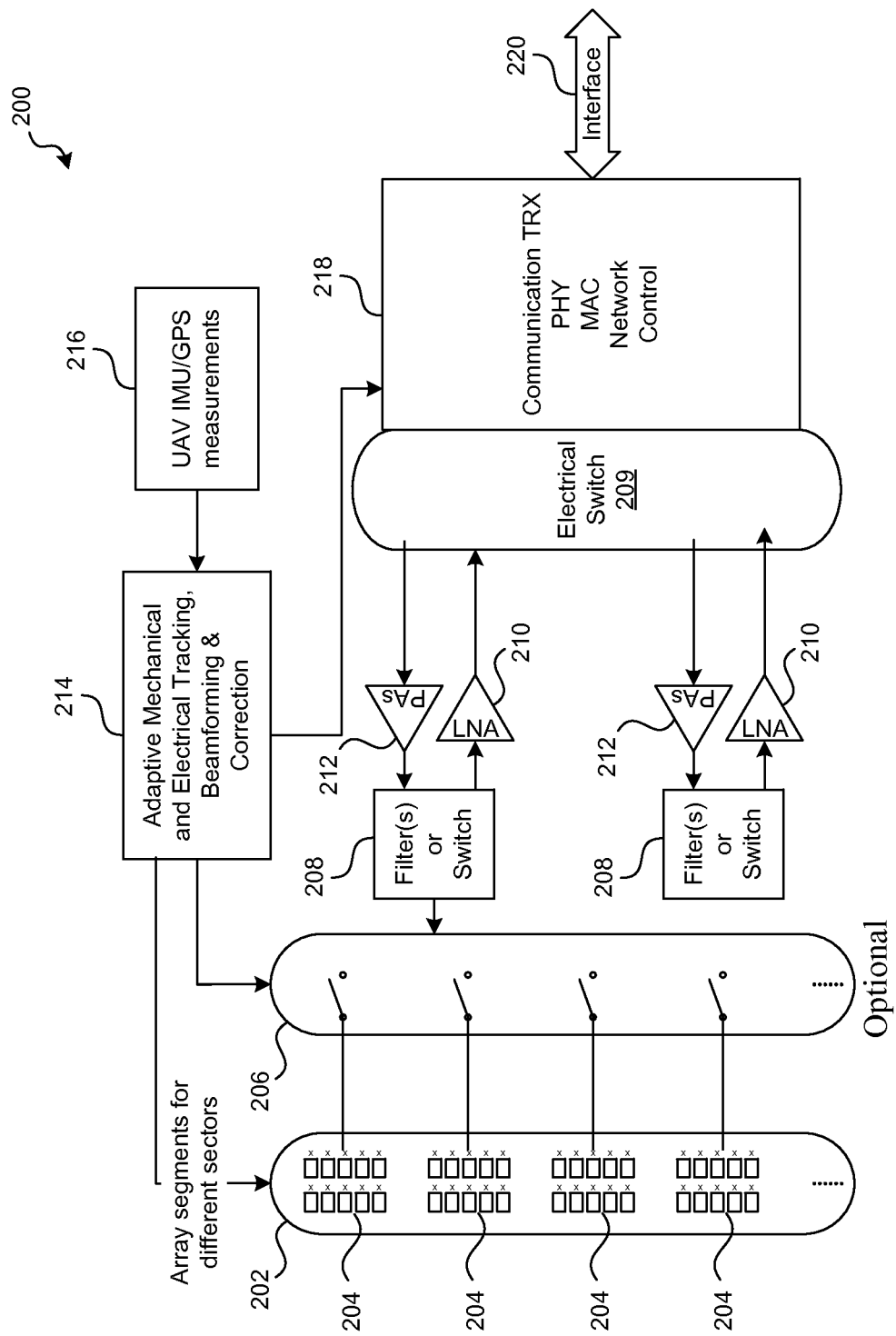
FIG. 2 is a block diagram illustrating an example transceiver using an adaptive antenna system.

FIG. 2 is a block diagram illustrating a high level block diagram of a transceiver apparatus 200. The apparatus 200 may be a part of the aerial vehicle 102 or the ground station 106.

An antenna array 202 includes antenna elements or patch antennas 204 that are dedicated to sectors of coverage. For example, four antenna elements may be used, each covering 90 degrees of a 360-degree coverage range. A switch, e.g., an electrical switch 209 from intermediate frequency (IF) to radio frequency, and an optional switch 206 at the antenna, may be used to control switching of the antenna system 202 from one sector to another. The switch 206 may also be optionally provided and used, e.g., only when the antenna array 202 is physically, or mechanically, movable. The switching system may be controlled by filters or switches 208. The filter/switch 208 may be used in radio signal transmission or reception paths to control the spectrum of the transmitted or received signal. Similarly, the filter/switch may filter received signals to reduce out-of-band noise during the processing and demodulation of the received signal.

A communication interface 218 may interface with a medium interface 220 to receive and transmit communication signals. The interface 218 may implement network-specific physical layer (PHY) and media access layer (MAC) protocols for signal transmission. Low noise amplifiers (LNA) 210 and power amplifiers (PA) 212 may be used between filters or switches 208 and the communication interface 218, as would be known to one having ordinary skill in the art of radio frequency transceiver apparatus.

An adaptive mechanical and electrical tracking, beam-forming and correction (TBC) module 214 may be used to control the operation of the antenna system 202 and the switches 206. The TBC module 214 may receive input from a location module 216. The location module 216 may receive signals and make calculations to determine the location and attitude of the transceiver so that the direction in which antenna aperture is to be maximized to receive the best possible signal over the medium interface 220 can be determined. For example, using a global positioning system (GPS) signal, the apparatus 200 may accurately determine the geographic and/or spatial location of operation of the transceiver apparatus. Using the inertial measurement unit (IMU) signals, the apparatus 200 may determine the direction in which the apparatus is moving or heading. In some embodiments, additional equipment such as an accelerometer or a gravitational sensor may be used to assist with the determination of orientation. By combining the IMU measurements and the GPS measurements, the apparatus 200 can determine its location and orientation and thus the optimal aperture direction for communication. This information may be used to orient the antenna elements, or antenna aperture in the correct nominal direction. For example, when the transceiver is a ground station, the IMU information can be used to determine the nominal attitude or the direction in which the antenna should point in order to maximize gain of the received UAV signal. In some embodiments, e.g., when the apparatus 200 is a ground station, the IMU information for the UAV may be received from the UAV and may be used by the ground-based station to determine the orientation of the antenna elements.

Figure 3:
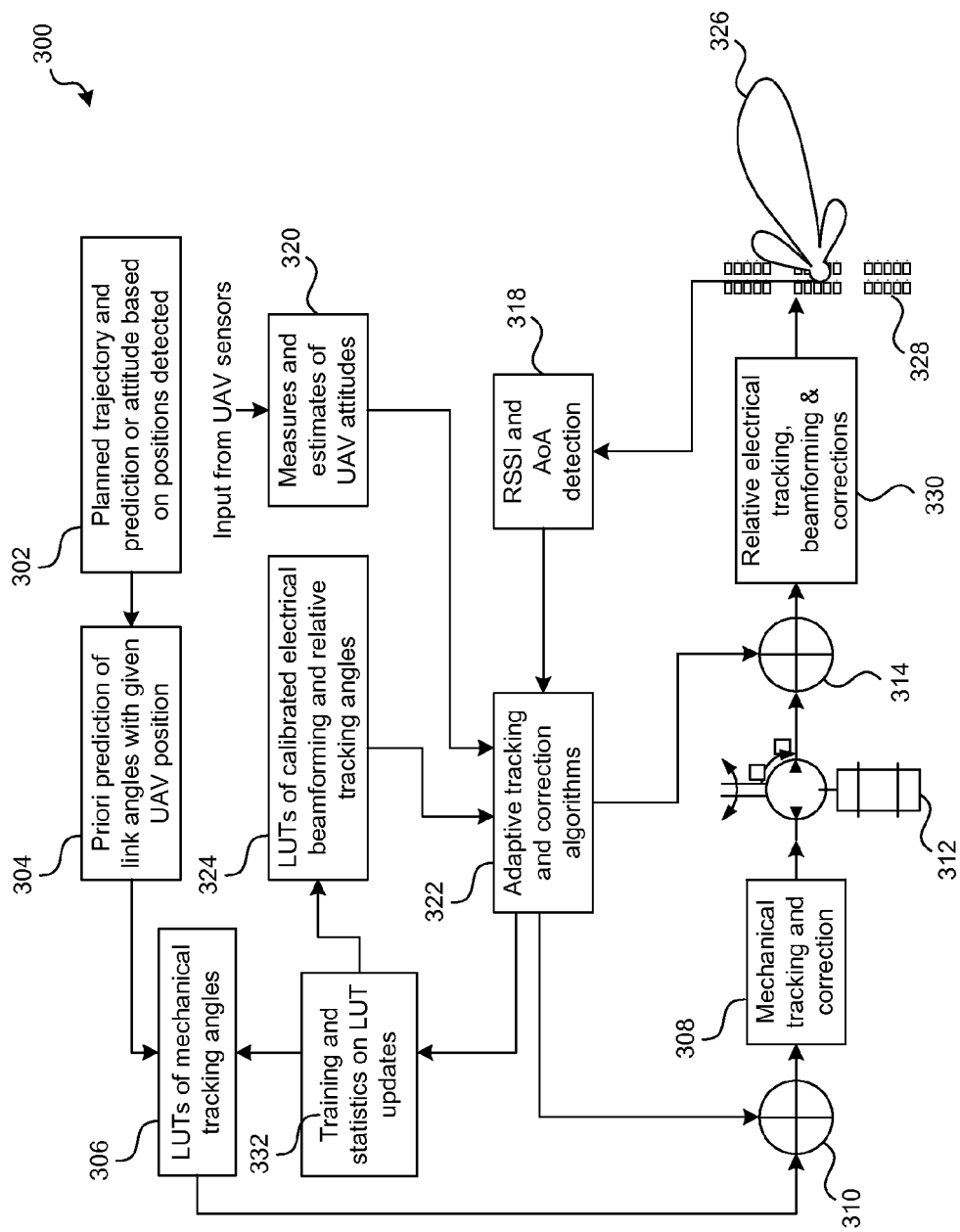
FIG. 3 is a block diagram illustrating an example antenna tracking and beamforming apparatus.

FIG. 3 is a block diagram illustrating a processing apparatus 300 that may steer the antenna subsystem of a transceiver, e.g., the aerial vehicle or the ground station. A module 302 may determine the trajectory of the apparatus 300 and determine its attitude from the position of the apparatus 300. A module 304 may determine the link angle, or orientation, for a given position of a transceiver, e.g., a UAV. The module 302, when implemented at a transmitter, may determine an optimal receiver attitude based on a GPS signal that provides information about the exact location and based on an inertial measurement unit (IMU) that indicates orientation of the apparatus 300. In various embodiments, the IMUs may include accelerometers or gyroscopes. A person having ordinary skill in the art would know suitable electronics and software that can estimate altitude and velocity of a UAV based on the GPS signal of the UAV. For example, a first derivative of the GPS (and/or IMU) signal as a function of time can be an estimate of the velocity of the UAV. The relative location of the aerial vehicle 102 (i.e., the distance from the aerial vehicle to the ground station) determines the time required for the wireless signal to travel from the aerial vehicle 102 to the ground station 106 (i.e., a timing difference).

A module 306 may store look-up tables (LUTs) that contain information about mechanical tracking angles as a function of the link angle at which the antenna beam should be pointing. Using the LUTs, the module 306 may provide a nominal signal for steering the antenna subsystem via a one-dimensional mechanical movement module 312.

The signal output of the LUT module 306 may be combined in a combiner 310 with a signal from an adaptive tracking and correction algorithm module 322 to provide an input to a mechanical tracking and correction module 308. The combiner 310 may, e.g., combine a priori stored LUT tracking angles with the corrections being performed based on the real-time measurements of the position of the UAV. The module 308 may be used to actuate the mechanical movement module 312 along a specified direction. For example, in some embodiments, the module 308 may control the amount and polarity of voltage applied or current supplied to an electrical motor or a gimbal to move the antenna subsystem proportional to a target correction resulting from the output of the combiner 310. In some embodiments, the target correction may be outside the limit of mechanical movement. In such a case, the module 308 may achieve the entire correction by partly performing mechanical rotation and partly performing electrical beamforming. As an example, an effective correction of 3 degrees may be obtained by rotating the antenna subsystem by 2 degrees and by rotating the electrical beamforming by an additional 1 degree. The mechanical movement that is obtained may be combined with the output of the module 322 (in combiner 314) to obtain an electrical switch to a subsection array or electrical correction to be applied to electrical beamforming in the relative electrical tracking, beamforming and corrections module 330. The output of the module 330 results in a beamforming (e.g., main aperture direction 326) of an antenna subsystem 328.

On the receiver side, the antenna subsystem 328 receives the signal transmissions from the transmitter of the UAV, which are analyzed by module 318 for received signal strength indicator (RSSI) and angle of arrival (AoA). The results of these calculations are input to the module 322 for real-time tracking and correction of the electrical and mechanical systems.

In some embodiments, inputs from UAV sensors that measure or estimate UAV attitude (the module 320) may also be used as input to the tracking and correction performed in the module 322. In some embodiments, the module 322 also receives values presently stored in LUTs of the currently calibrated electrical beamforming and relative tracking angles (module 324). Using these inputs, the module 322 may perform training and track statistics on LUT updates 332, which are then provided as input to LUTs that list mechanical tracking angles.

The module 322 may thus continually monitor quality of received signals, e.g., by comparing a reference signal, whose "as transmitted" phase and magnitude are known a priori ("expected signal"), with the actual received signal. When the received signal deviates from the expected signal, the module 322 may generate a feedback signal to modify the mechanical position of the antenna subsystem 328 and another feedback signal to adjust the beam pattern, e.g., phase and gain of the antenna array. Because the relative movement between an aerial vehicle and a ground station is generally expected to be smooth and continuous, in the absence of possible unpredictable variations in the altitude of the aerial vehicle, the combined mechanical and electrical tracking subsystem ideally tracks the transmitter position with a smooth and continuous adjustment of the mechanical orientation of the antenna and the electrical beamforming, with the same LUT settings, repeatedly as the aerial vehicle follows a specified (e.g., a circular) aerial path, e.g., flight path 110.

However, in actual deployments, the attitude of an aerial vehicle during its aerial rotation, e.g., one 360-degree traversal along a circular flight path, from one rotation to the next rotation may not be exactly the same, and thus the tracking algorithm may adjust the mechanical settings and/or the electrical settings, e.g., values stored in the LUTs, on a continual basis.

In some embodiments, the module 304 may generate a signal to pre-adjust the antenna aperture pointing direction using a mechanical movement module that may exert digital or analog motor control based on the trajectory and attitude control system that counter-rotates the aperture surface based on the attitude of the aerial vehicle. As previously described, the module 302 may be used to provide planned trajectory input.

In some embodiments, the receiver may nominally divide the 360 degree range of movement of the transmitter into K sections, each section having N array apertures. At a given time t, M sectors (M<=K) may be viewed by an involved terminal (gateway or consumer premises equipment).

The number of antennas may be limited due to the size or weight restrictions on the transceiver. Therefore, instead of one antenna being dedicated to each sector of coverage, the number of antennas may be less than the number of sectors, with at least some antennas capable of being mechanically moved to cover multiple sectors. The mechanical movement may, e.g., cause antenna elements to physically change their orientation. Alternatively or additionally, rotation in the electrical domain can be obtained by using an antenna array with multiple antenna elements and by electrically changing phases of signals received at the antenna elements. For example, in some embodiments a 4×4 patch array antenna may be used such that the patch array may be capable of being moved (electrically) by 10 degrees each, with each antenna quad used to cover one of four sectors that make up the entire flight path.

In some embodiments, the antenna system may be located on the underbelly of wings of the UAV. The antenna may be generally flat, with its aperture pointing towards the ground, thus allowing high-gain communication without impacting aerodynamics of the aerial vehicle.

Figure 4:
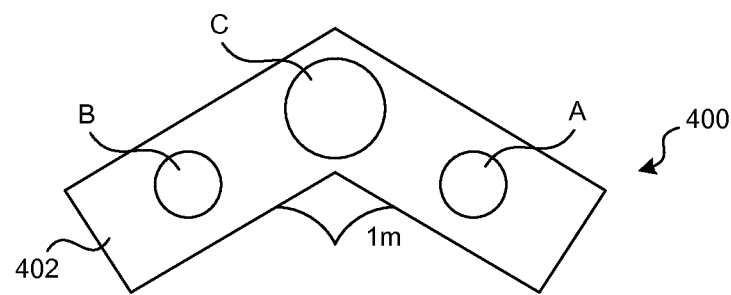
FIG. 4 is a block diagram illustrating an example UAV equipped with an adaptive antenna system.

FIG. 4 is a block diagram illustrating an example underbelly of an aerial vehicle 400 (which may be similar to the aerial vehicle 102). The wings 402 of the aerial vehicle 400 may be fitted with one or more antennas and/or a multi-subsection antenna (with subsection being denoted as a, b, and c), at least some of which may be used at a given time for communication on the link 112. While a circular antenna shape is depicted in FIG. 4, antennas having other shapes, e.g., rectangular patch arrays, square antennas, etc., may be suitably used.

Figure 5:
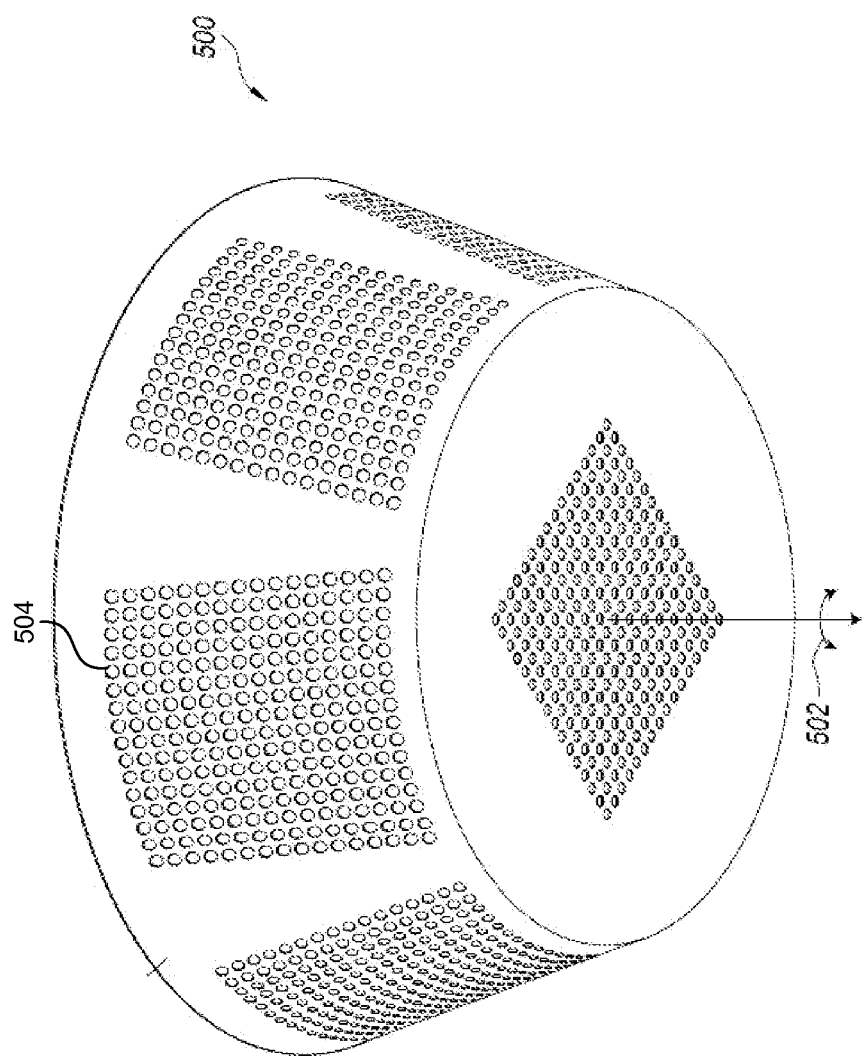
FIG. 5 is a diagram illustrating an example beamforming antenna system.

FIG. 5 depicts an antenna system 500 that is rotatable along an axis 502 or can electrically switch subsections, such as subsection 504. The antenna system 500 may include a planar structure in a plane orthogonal to the axis 502, with multiple antenna elements organized as subsections 504. The dish slope angle may be based on the UAV assembly location, e.g., whether the antenna is on a vertical side or a horizontal side under the UAV. The antenna system 500 may be controllable via mechanical rotation along the axis 502. The antenna system 500 may also be controllable via electrical switching between subsections and beamforming of the phased array antennas of each subsection, such as subsections 504. The phased array can be reconfigurable for different beam pointing requirements. The element of the array can vary to fit the geometry, such as patch, horn, dipole, etc.

Figure 6:
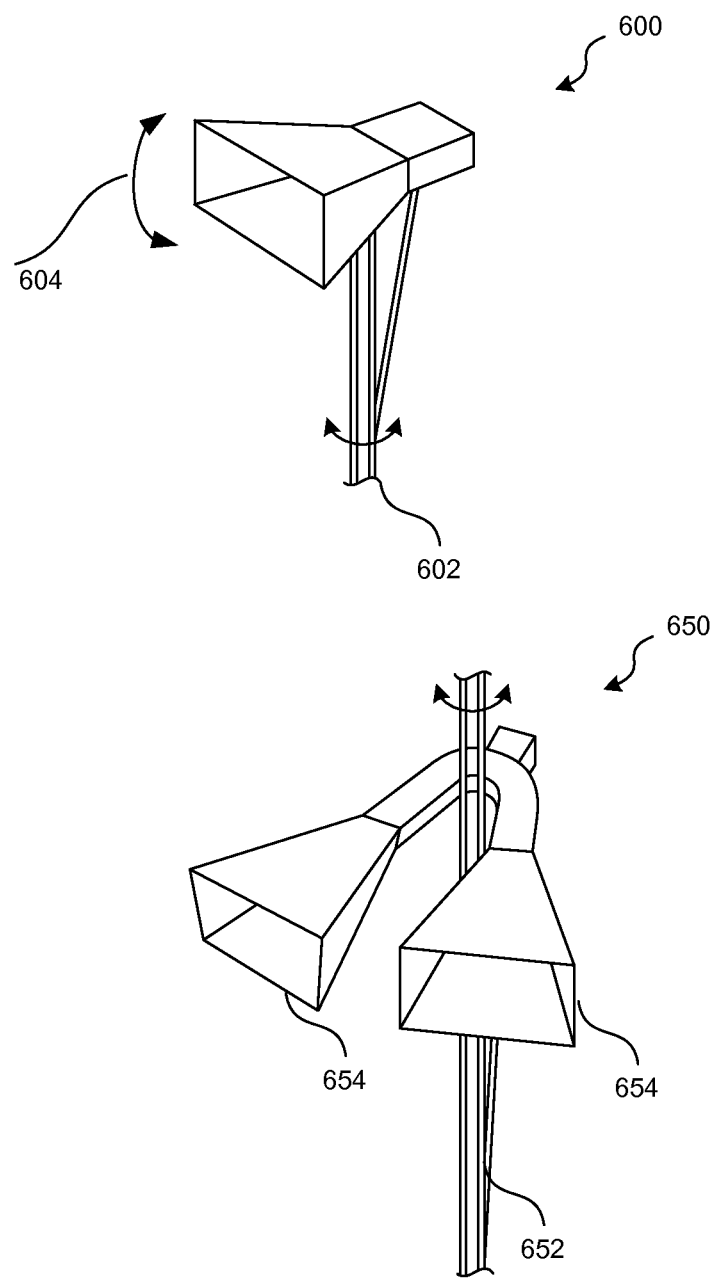
FIG. 6 is a diagram illustrating examples of horn antennas that can be used for adaptive tracking and beamforming.

FIG. 6 illustrates an example of a horn antenna 600 that has a single horn that generally lies in a plane that is orthogonal to a rotational axis 602. As depicted by the arrow 604, the flare portion of the horn antenna may be rotatable to adjust the elevation angle at which the horn is pointing. In some embodiments, the nominal flying height and attitude of the aerial vehicle 102 may be known, and accordingly, the nominal angle at which the flaring end of the horn antenna is tilted upwards at the ground station, or tilted downwards at the aerial vehicle, may be determined from the known elevation of operation.

FIG. 6 also illustrates an example of multi-antenna systems, such as a two-horn antenna 650, which has two flaring portions 654 that may be generally coplanar with respect to each other. The portions 654 may be rotatable around an orthogonal axis 652. Similar to the horn antenna 600, the flaring portions 654 may be tiltable upwards or downwards based on the elevation of operation of the aerial vehicle. In comparison with the horn antenna 600, the two-horn antenna 650 may be more suitable to cover a wider angle of the movement of an aerial vehicle. Such may be the case when the distance between the ground station and the aerial vehicle is relatively shorter, thereby covering a larger angle of view from one end of the circular path to the other end.

In some embodiments, directional aperture(s) or phased arrays, e.g., as described with respect to FIG. 4, FIG. 5 and FIG. 6 can be used. The normal direction of the aperture surface may be pre-adjusted and set and optimally aligned with ground antennas based on the required geography conditions, such as range of elevation angle, or altitude of operation of the aerial vehicle.

In some embodiments, to assist with the steering of the antenna beam, the transmitter may periodically transmit a reference signal that is known to the receiver. Based on knowledge of the time at which to expect the reference signal and the shape of the reference signal, the receiver may compare the actual received signal with the ideal received signal and derive information about correction to the current mechanical and electrical systems.

The periodicity with which the reference signal is transmitted may be pre-set or may be changeable based on requests from the receiver to the transmitter to increase or reduce the frequency of reference signal transmissions depending on the receiver's calculation of how accurately the receiver is able to track the relative movement between the transmitter and the receiver.

It will be appreciated that the disclosed techniques can be used to perform mechanical rotation of the reference plane of electrical beamforming based on orbit location and UAV attitude. Put differently, when an aerial vehicle 102 is known to have a flight path that does not require X-Y movement, in some embodiments, it may be possible to use an antenna system that foregoes a gimbal, which is used to move the antenna in two axial directions. Instead, an antenna array may be moved only in one plane or along a single axis.

Figure 7:
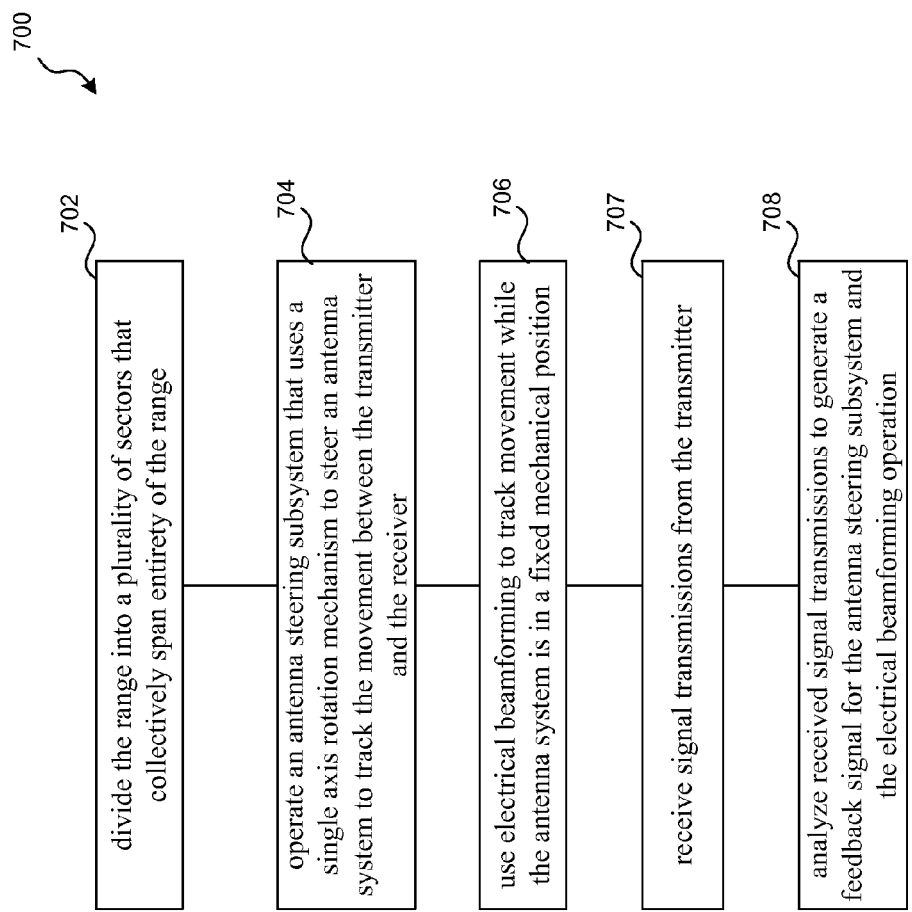
FIG. 7 is a flow chart illustrating an example method of using antenna tracking and beamforming for wireless communication.

FIG. 7 is a flow chart illustrating an example method 700 for tracking relative movement between one or more transmitters and one or more receivers in an RF communication system. For example, the one or more transmitters may be located at one of the aerial vehicle 102 and the ground station 106. The one or more receivers may be located at the other one of the aerial vehicle 102 and the ground station 106.

At block 702, the method 700 divides a range of the tracking into a plurality of sectors that collectively span the entire range. The calculation of how many sectors to use for a given range of a UAV may be a design choice used by implementers and may be decided prior to the deployment of an aerial vehicle.

In some embodiments described herein, a horn antenna is used. For example, the horn antennas 600, 650 illustrated in FIG. 6 may be used for tracking and beamforming.

At block 704, the method 700 includes operating an antenna steering subsystem that uses a single axis rotation mechanism to steer an antenna system to track the movement between the transmitters and the receivers. As described with respect to FIG. 6, the horn antenna may be positioned such that only one axial rotation, or a one-dimensional movement, is used for tracking between the aerial vehicle and ground station. While the aerial vehicle 102 moves in its circular flight path 110, the antenna 600 may be rotated around the axis 602 to cover the entire range of rotation of the UAV. The method 700 also includes using an electrical antenna switch to electrically combine signals received at the multiple antenna subsections.

At block 704, the antenna system may include an antenna steering subsystem that steers the antenna into one of multiple positions, each position corresponding to a portion of the entire range of tracking. In some embodiments, the antenna steering subsystem may rotate the reference plane of the electrical beam based on its calculated estimate of the attitude of the aerial vehicle.

At block 706, the method 700 may use electrical beamforming to track movement while the antenna system is in a fixed mechanical position. The electrical beamforming may be performed using feedback signals, as described with respect to FIG. 2 and FIG. 3 herein. For example, in some embodiments, the method 700 may adjust a phase component of the antenna system and a gain component of the antenna system.

At block 707, the method 700 receives signal transmissions from the transmitter. In some embodiments, the transmitter may transmit signals using an industry standard such as Long Term Evolution (LTE) or Wi-Fi. In some embodiments, the signal transmissions include data transmissions and control message transmissions, including reference signal transmissions. The reference signals may be sent using time, code, or frequency resources that are known a priori to the receiver, or they can be calculated by the receiver using known formulas, in order to facilitate the receiver's analysis of the received signals to generate an antenna tracking feedback signal.

At block 708, the method 700 may analyze the received signal transmissions to generate a feedback signal for the antenna steering subsystem and the electrical beamforming operation. In method 700, the electro-mechanical steering is performed using the feedback signal. In some embodiments, the feedback signal generation may be performed as described with respect to FIG. 2 and FIG. 3.

The method 700 may be performed at a ground station 106 to track the movement of a transmitter housed on the aerial vehicle 102 and may track a 360-degree movement, e.g., the flight path 110, where the ground station may be relatively in a fixed location.

In some embodiments, using the method 700 and as depicted in FIG. 3, two feedback loops may be used in tuning and correction of the tracking angles. The first feedback loop may correct the input to the module 308 to improve the mechanical tracking and correction. The second feedback loop may correct input to the electrical tracking module 330 to improve the electrical antenna beamforming.

In some embodiments, the phase of the antenna beam may be adjusted based on an estimate of the angle of arrival of the received signal. For adjusting the phase, mechanical switching may be performed only at the ground station, with no mechanics in the air, thereby simplifying design of the aerial vehicle.

Alternatively, or in addition, in a digital embodiment, the antenna switching decision is made in real time, based on numerical or digital computation of the angle or arrival estimate. For example, in some embodiments, a phased array of antennas (e.g., a 16×16 antenna array) with an analog phase shifter may be used.

In some embodiments, an antenna system includes an antenna array, or simply an antenna, having multiple subsections that are movable in one direction. The antenna system may include an electrical switch matrix to combine signals received at the multiple subsections of the antenna system. A mechanical system is coupled to the antenna array to move the antenna array along the one direction. Also coupled to the antenna array is an electrical subsystem that performs antenna beamforming to steer the antenna beam in the direction of a transmitter of RF signals. The transmitter's relative position with respect to the antenna system may move in a 360-degree circular shape. The mechanical system may cover the range of the transmitter's relative position at a first level of granularity, and the electrical subsystem may cover the transmitter movement within each level of granularity using electrical beamforming. For example, in some embodiments, the mechanical system may switch the antenna position while the electrical subsystem is tracking the antenna beam moving along the direction of movement of the transmitter. In some embodiments, the antenna system may include a horn antenna. In some embodiments, the horn antenna may have a single feed. In some embodiments, the horn antenna may have two feeding horns, e.g., as depicted in FIG. 6.

As previously described, the mechanical system may move the antenna system along only a single direction, thereby reducing the complexity of the mechanical parts. In some embodiments, the electrical switch matrix may combine the signals received at the multiple subsections by using at least some of: a digital beamforming technique, a radio frequency switch, an intermediate frequency switch and a mechanical switch. In some embodiments, the received signal transmissions may be analysed by receiving information about condition of a link via which the signals are received, including one or more of: a global positioning system signal measurement, an inertial navigation system measurement, a link signal measurement, and a beam interference measurement, e.g., as described with respect to FIG. 3.

In some embodiments, a radio frequency receiver apparatus includes an antenna system comprising one or more antennas movable along one direction, a memory for storing instructions, and a processor that reads the instructions from the memory and implements a method of adaptive antenna tracking and beamforming. The method includes receiving reference signal transmissions, and analyzing received reference signal transmissions to generate a first feedback signal for an antenna steering subsystem and a second feedback signal for an antenna beamforming system. The first feedback signal causes the antenna steering subsystem to move the one or more antennas along the one direction. The second feedback signal electrically adjusts the aperture of the antenna system. In some embodiments, the one or more antennas comprise horn antennas that are movable along an axis orthogonal to a plane of the horn antennas. In some embodiments, the first feedback signal may be used to look up entries of an LUT, e.g., as described with respect to module 306. The LUTs may also be continually updated based on the success measured during operation.

Figure 8:
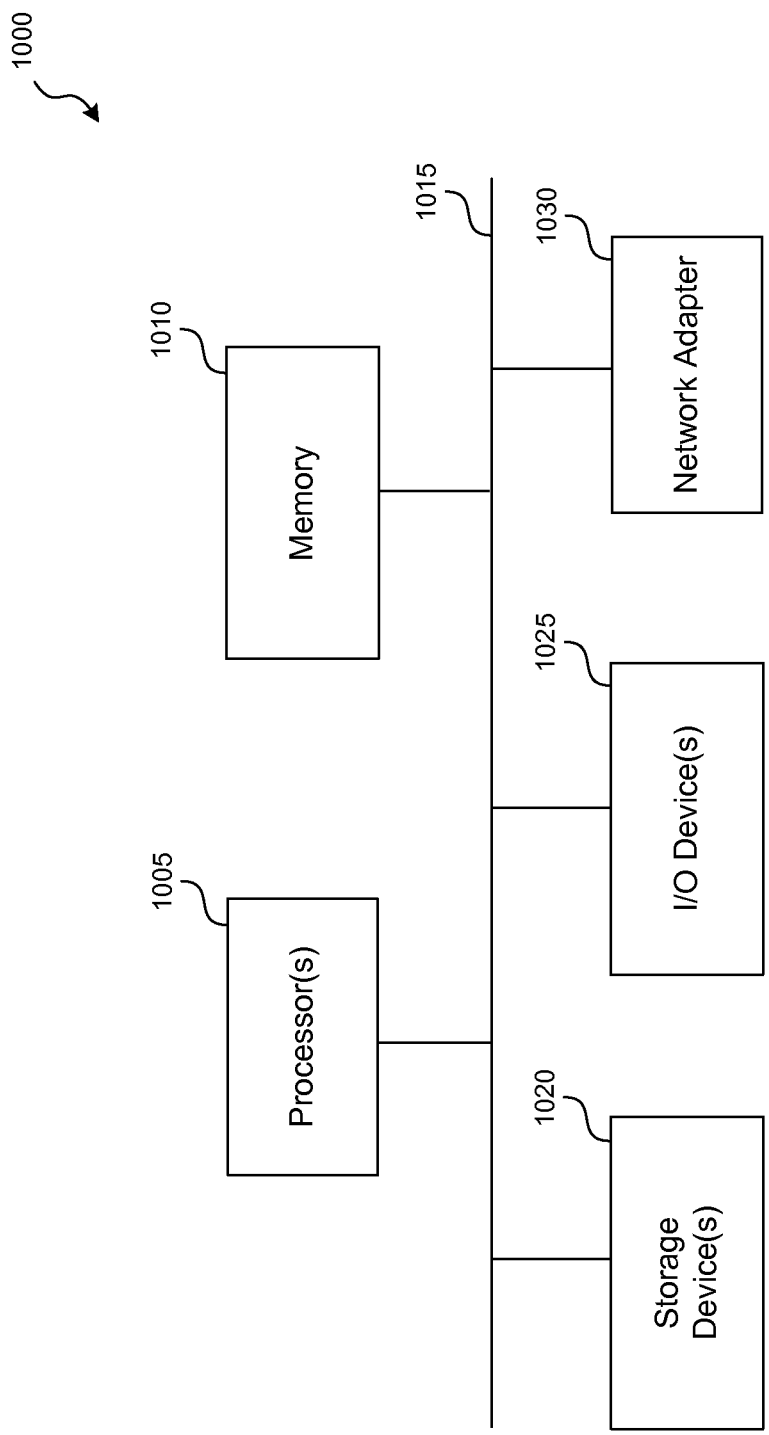
FIG. 8 is a block diagram illustrating an example of a transceiver apparatus that uses adaptive antenna tracking and beamforming for digital communication.

FIG. 8 is a block diagram illustrating an example of a digital communication transceiver system 1000 that may use the antenna beamforming and tracking techniques described herein. The digital communication transceiver system 1000 may include one or more central processing units ("processors") 1005, memory 1010, input/output devices 1025 (e.g., keyboard and pointing devices, display devices), storage devices 1020 (e.g., disk drives), and network adapters 1030 (e.g., network interfaces) that are connected to an interconnect 1015. The interconnect 1015 is illustrated as an abstraction that represents any one or more separate physical buses, point-to-point connections, or both connected by appropriate bridges, adapters, or controllers. The interconnect 1015 may therefore include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), an IIC (I2C) bus, or an Institute of Electrical and Electronics Engineers (IEEE) standard 1394 bus, also called "Firewire."

The memory 1010 and storage devices 1020 are computer-readable storage media that may store instructions that implement at least portions of the various embodiments. In addition, the data structures and message structures may be stored or transmitted via a data transmission medium, e.g., a signal on a communications link. Various communications links may be used, e.g., the Internet, a local area network, a wide area network, or a point-to-point dial-up connection. Thus, computer-readable media can include computer-readable storage media (e.g., "non-transitory" media) and computer-readable transmission media.

The instructions stored in memory 1010 can be implemented as software and/or firmware to program the processor(s) 1005 to carry out the actions described above. In some embodiments, such software or firmware may be initially provided to the digital communication transceiver 1000 by downloading it from a remote system through the digital communication transceiver 1000, e.g., via the network adapter 1030.

It will be appreciated by one of skill in the art that techniques for optimal beam orientation and antenna gain for the operation of an aerial vehicle as a relay or transceiver for wireless communication are disclosed.

It will further be appreciated by one of skill in the art that the disclosed embodiments can achieve antenna tracking using mechanical movement in only one dimension and combining with simple subsector array beamforming to help optimize mass constraint, antenna gain, and steerable range of the antenna subsystem.

It will further be appreciated by one of skill in the art that, in one beneficial aspect of the disclosed technology, off-the-shelf antennas, such as horn antennas, can be used for embodiments of the antenna system.

The various embodiments introduced herein can be implemented by, for example, programmable circuitry, e.g., one or more microprocessors, programmed with software and/or firmware, or entirely in special-purpose hardwired (non-programmable) circuitry, or in a combination of such forms. Special-purpose hardwired circuitry may be in the form of, for example, one or more application specific integrated circuits (ASICs), programmable logic devices (PLDs), field programmable gate arrays (FPGAs), etc.

The disclosed and other embodiments, modules and the functional operations described in this document (e.g., an optical receiver, a distortion compensator, a step size controller, etc.) can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA or an ASIC.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD ROM and DVD-ROM disks. The processor and the memory can be supplemented by, or incorporated in, special purpose logic circuitry.

While this patent document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few examples and implementations are disclosed. Variations, modifications, and enhancements to the described examples and implementations and other implementations can be made based on what is disclosed.

The invention claimed is:

1. A method of tracking relative movement between one or more transmitters and one or more receivers in a radio frequency communication system in which the relative movement between the one or more transmitters and the one or more receivers is within a range of angle of an aerial vehicle housing one of the one or more transmitters or the one or more receivers, comprising:
dividing the range into multiple sectors that collectively span an entirety of the range;
operating an antenna steering subsystem that uses a single axis rotation mechanism to cause an antenna system to track the relative movement between the one or more transmitters and the one or more receivers;
using electrical beamforming to refine tracking of the relative movement while the antenna system is in a fixed mechanical position;
receiving signal transmissions from the one or more transmitters; and
analyzing the received signal transmissions to generate a feedback signal to control operation of the antenna steering subsystem and the electrical beamforming.

2. The method of claim 1, wherein the receiving signal transmissions includes receiving signal transmissions using a horn antenna.

3. The method of claim 2, wherein the single axis rotation mechanism rotates the antenna system along one direction only.

4. The method of claim 1, wherein the analyzing the received signal transmissions includes:
computing a received signal strength indicator that estimates power level of a received reference signal.

5. The method of claim 1, wherein the analyzing the received signal transmissions includes:
combing angles of arrival of the received signal transmissions at multiple subsections antenna and/or antenna arrays.

6. The method of claim 1, wherein the receiving the signal transmissions from the one or more transmitters includes receiving the signal transmissions from the aerial vehicle and the generating the feedback signal includes generating the feedback signal to correct for the transmitter range for a 360-degree movement of the aerial vehicle with respect to a fixed position of the one or more receivers.

7. The method of claim 1, wherein the operating the antenna steering subsystem continually adjusts an aperture of the antenna system to maximize electrical gain of the received signal transmissions.

8. The method of claim 1, wherein the using the electrical beamforming includes:
adjusting a phase component and a gain component of the antenna system.

9. The method of claim 1, wherein the operating the antenna steering subsystem includes:
operating the antenna steering subsystem to steer the antenna system to one of multiple antenna positions corresponding to the multiple sectors.

10. The method of claim 9, wherein the antenna steering subsystem rotates a reference plane of the electrical beamforming based on an angle of the aerial vehicle.

11. The method of claim 1, wherein the operating the antenna steering subsystem includes:
operating the antenna steering subsystem to concurrently track multiple communication links.

12. The method of claim 1, further comprising:
performing the electrical beamforming using an electrical antenna switch to combine multiple signals received by the antenna system.

13. An antenna system of a receiver, comprising:
an antenna array having multiple subsections, wherein at least some subsections are movable in one dimension;
an electrical switch matrix that combines signals received at the multiple subsections;
a mechanical system coupled to the antenna array to move the antenna array;
an electrical subsystem configured to perform beamforming to steer a radio frequency beam emitted by the antenna array in a direction of a transmitter,
wherein a relative position of the transmitter with respect to the antenna system moves in a range comprising a 360-degree circle in a plane, wherein the mechanical system covers the range at a first level of granularity and the electrical subsystem performs beamforming at each of the first level of granularity.

14. The system of claim 13, wherein the antenna system includes at least one of a horn antenna and a patch antenna.

15. The system of claim 14, wherein the mechanical system moves the antenna system along one direction only.

16. The system of claim 13, wherein the electrical switch matrix combines the signals received at the multiple subsections by using at least some of: a digital beamforming technique, a radio frequency switch, an intermediate frequency switch and a mechanical switch.

17. The system of claim 13, wherein the electrical subsystem analyzes the received signal transmissions from the transmitter by:
computing a received signal strength indicator that estimates power level of a received reference signal and phases of the received reference signal at the multiple subsections.

18. The system of claim 13, wherein the electrical subsystem analyzes the received signal transmissions from the transmitter by:
receiving information about condition of a link via which the signals are received, including one or more of: a global positioning system signal measurement, an inertial navigation system measurement, a link signal measurement, and a beam interference measurement.

19. The system of claim 13, wherein the transmitter is housed on an aerial vehicle and the range includes a 360-degree movement of the aerial vehicle with respect to a fixed position of the receiver.

20. The system of claim 13, wherein the mechanical system and the electrical subsystem continually adjust an aperture of the antenna array to maximize an electrical gain of the received signals.

21. The system of claim 13, wherein the electrical subsystem performs electrical beamforming by:
adjusting a phase component and a gain component of the antenna system.

22. The system of claim 13, wherein the mechanical system steers the antenna array to one of multiple positions corresponding to the plurality of subsections.

23. The system of claim 22, wherein the mechanical system rotates a reference plane of the electrical beamforming based on the attitude of the aerial vehicle.

* * * * *